(12) United States Patent
Amthor et al.

(10) Patent No.: US 11,829,444 B2
(45) Date of Patent: Nov. 28, 2023

(54) MICROSCOPY SYSTEM AND METHOD FOR VERIFICATION OF A TRAINED IMAGE PROCESSING MODEL

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 115 days.

(21) Appl. No.: 17/494,014

(22) Filed: Oct. 5, 2021

(65) Prior Publication Data

US 2022/0114398 A1 Apr. 14, 2022

(30) Foreign Application Priority Data

Oct. 9, 2020 (DE) ...................... 10 2020 126 598.0

(51) Int. Cl.
*G06F 18/21* (2023.01)
*G06V 10/75* (2022.01)

(52) U.S. Cl.
CPC .......... *G06F 18/217* (2023.01); *G06V 10/751* (2022.01)

(58) Field of Classification Search
USPC ........................................................ 382/159
See application file for complete search history.

(56) References Cited

U.S. PATENT DOCUMENTS 11,373,422 B2 * 6/2022 Sakane .................. G16H 50/20
11,580,390 B2 * 2/2023 Anderson .............. G16H 10/60
(Continued)

FOREIGN PATENT DOCUMENTS

DE 102017109698 A1 11/2018
DE 102017111718 A1 12/2018
(Continued)

OTHER PUBLICATIONS

C. Ling, M. Halter, A. Plant, M. Majurski, J. Stinson and J. Chalfoun, "Analyzing U-Net Robustness for Single Cell Nucleus Segmentation from Phase Contrast Images," 2020 IEEE/CVF Conference on Computer Vision and Pattern Recognition Workshops (CVPRW), Seattle, WA, USA, 2020, pp. 4157-4163, (Year: 2020).*

(Continued)

*Primary Examiner* — Ishrat I Sherali
(74) *Attorney, Agent, or Firm* — LaBatt, LLC (57) ABSTRACT

A microscopy system comprises a microscope which can record at least one microscope image and a computing device which comprises a trained image processing model set up to calculate an image processing result based on the at least one microscope image. A method for verifying a trained image processing model, which can be performed by the computing device, can include receiving a validation image and an associated target image; entering the validation image into the trained image processing model, which calculates an output image therefrom; entering image data based on at least the output image and the associated target image into a trained verification model which is trained to calculate an evaluation that indicates a quality that depends on the image data for entered image data; and calculating an evaluation by the trained verification model based on the entered image data.

15 Claims, 8 Drawing Sheets

(56) References Cited

U.S. PATENT DOCUMENTS

| | | | |
|---|---|---|---|
| 2020/0057291 A1 | 2/2020 | Haase et al. | |
| 2020/0088984 A1 | 3/2020 | Haase et al. | |
| 2020/0200531 A1 | 6/2020 | Amthor et al. | |
| 2020/0202508 A1 | 6/2020 | Amthor et al. | |
| 2020/0371333 A1 | 11/2020 | Amthor et al. | |
| 2020/0371335 A1 | 11/2020 | Amthor et al. | |
| 2022/0207742 A1* | 6/2022 | Lin | G06V 10/82 |
| 2022/0343623 A1* | 10/2022 | Li | G06T 5/001 |
| 2022/0351347 A1* | 11/2022 | Yang | G06F 18/217 |

FOREIGN PATENT DOCUMENTS

| | | |
|---|---|---|
| DE | 102018133188 A1 | 6/2020 |
| DE | 102018133196 A1 | 6/2020 |
| DE | 102019113540 A1 | 11/2020 |
| DE | 102019114012 A1 | 11/2020 |

OTHER PUBLICATIONS

Ding et al., A Machine Learning Based Framework for Verification and Validation of Massive Scale Data,, IEEE Transaction on Big Data, vol. 7, No. 2, Apr.-Jun. 2021, pp. 451-467. (Year: 2021).*

Hofmeister, DE Application No. 102020126598.0, Search Report, dated Jul. 1, 2021, 9 pages (no English translation available).

Mac, Brandon et al., "Siamese Content Loss Networks for Highly Imbalanced Medical Image Segmentation," Proceedings of Machine Learning Research 121:503-514, 2020, 12 pages.

Kobayashi, Kazuma et al. "Unsupervised Brain Abnormality Detection Using High Fidelity Image Reconstruction Networks," Division of Molecular Modification and Cancer Biology, Jun. 2, 2020, 39 pages.

Ma, Jun et al., "How Distance Transform Maps Boost Segmentation CNNs: An Empirical Study," Proceedings of Machine Learning Research 121: 479-492, 2020, 14 pages.

* cited by examiner

MICROSCOPY SYSTEM AND METHOD FOR VERIFICATION OF A TRAINED IMAGE PROCESSING MODEL

REFERENCE TO RELATED APPLICATIONS

The current application claims the benefit of German Patent Application No. 10 2020 126 598.0, filed on 9 Oct. 2020, which is hereby incorporated by reference.

FIELD OF THE DISCLOSURE

The present disclosure relates to a microscopy system which uses a trained image processing model for processing microscope images, and to a method for verifying a trained image processing model.

BACKGROUND OF THE DISCLOSURE

Automation and user comfort are increasingly important in modern microscopy systems and other measuring devices. By way of example, a sample to be examined should be captured, honed in on and examined in more detail in largely automated fashion by a microscopy system. To this end, the user is offered an overview or navigation map, within the confines of which the user can select a location that can then be automatically honed in on by a motor-driven sample stage and which can be examined under higher magnification. An automated sample recognition can also serve for collision protection by virtue of defining permitted displacement regions of motor-driven microscope components on the basis of the recognized sample or the recognized sample carrier. Certain sample structures can be recognized automatically and analyzed in more detail in the recorded sample images. Biological cells can be counted automatically or a plurality of partial images can be combined to form an overall image (image stitching).

For these applications, a microscope image, which may be an overview image or a microscopic sample image, is analyzed by various image processing programs. In this context, trained image processing models are often superior to conventional algorithms and therefore find increasing use.

Thus, a generic microscopy system comprises a microscope which is set up to record at least one microscope image and a computing device which comprises a trained image processing model set up to calculate an image processing result (output image) on the basis of the at least one microscope image.

An imaging processing model is trained by a learning algorithm on the basis of specified training data. By way of example, the image processing model can be a deep neural network and, in particular, comprise a CNN (convolutional neural network) or FCN (fully convolutional network). Model parameters of the image processing model, for example entries of convolution matrices of a CNN, are defined with the aid of the training data in a learning process, which may be supervised or unsupervised in particular. The training data, a selection of the model architecture and various properties of the training procedure influence the quality of the resultant image processing model.

Figure 1:
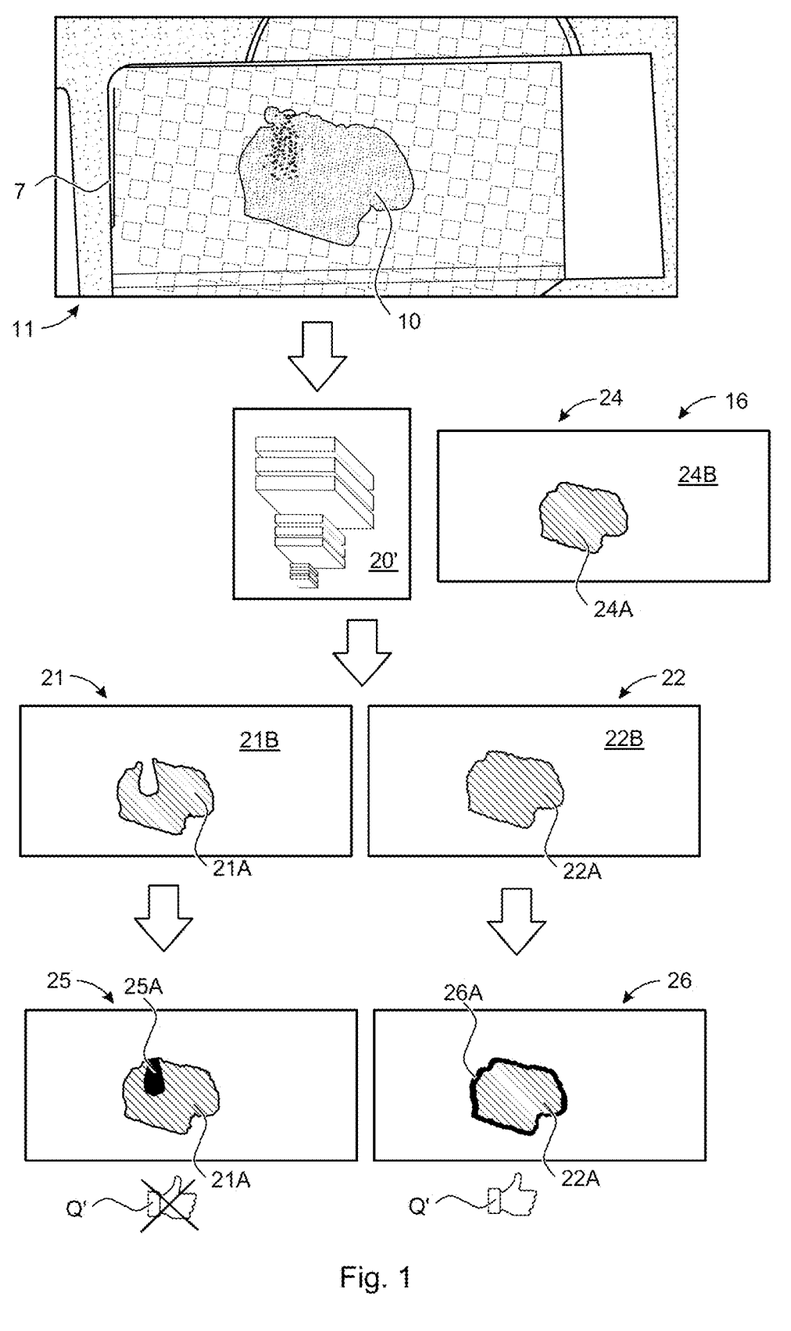
FIG. 1 is a schematic representation of image processing using a trained image processing model.

Thus, before a trained image processing model is used in the microscopy system it should be verified using validation or test data. These are (microscopy) images, for which the desired image processing results (target data) are already known or specified. A quality of the image processing model can be evaluated by a comparison of the target data to the image processing results calculated by the trained image processing model from the validation or test data. Reference is made to FIG. 1 in order to make it easier to understand both the technical background and the difficulties arising.

FIG. 1 schematically illustrates a microscope image 11 that was recorded by a microscope. The microscope image 11 shows a sample carrier 7, a sample 10 to be examined and sample surroundings, for example parts of a displaceable sample stage or a holder for the sample carrier 7.

The microscope image 11 is entered into a trained image processing model 20'. In this example, the image processing model 20' is a segmentation model trained to calculate a segmentation mask in which a distinction is made between sample regions and non-sample regions. Two possible results of the image processing model 20' are illustrated, specifically a segmentation mask 21 and a segmentation mask 22. These segmentation masks 21 and 22 are binary masks, in which one of the two possible pixel values indicates a belonging of the corresponding pixel to a sample region 21A, 22A, while the other pixel value indicates that the corresponding pixels do not represent the sample (background 21B, 22B). During the training or for the purposes of evaluating the quality of the image processing model 20', it is possible to compare the segmentation mask 21 or 22 to a specified target image 16 ("ground truth"). The target image 16 is a specified (target) segmentation mask 24 with a correct sample region 24A and background 24B.

A comparison of the segmentation masks 21, 22 with the target image 16 is shown schematically in the comparison images 25 and 26: The comparison image 25 is a superposition between the segmentation mask 21 and the specified target image 16 while the comparison image 26 is a superposition between the segmentation mask 22 and the specified target image 16. A segmentation error 25A specifies those image regions in the comparison image 25 where the sample region 22A differs from the sample region 24A specified to be correct in the target image 16. Analogously, the segmentation error 26A in the comparison image 26 specifies the difference between the sample region 22A and the sample region 24A of the target image 24. As is evident from FIG. 1, the segmentation error 25A is concentrated at a single location, as a result of which the shape of the sample region 22A differs significantly from the correct shape of the sample region 24A as per target image 16. By contrast, the segmentation error 26A forms a thin ring around the sample region 22A, which in terms of its shape substantially corresponds to the correct shape of the sample region 24A as per target image 16. 95% of all image pixels were segmented correctly in both cases, i.e., the area of the two error regions 26A and 26B is the same, specifically 5% in each case. Conventional evaluation measures, for example the pixel-wise accuracy of the segmentation or the area correspondence between segmentation mask and target image (Jaccard coefficient; intersection-over-union), evaluate both cases to be equally good, which is schematically plotted as evaluations Q'. However, the segmentation mask 22 can be usable in some applications while the segmentation mask 21 is inadequate. As a rule, relatively small edge deviations are more acceptable than a whole sample region missing. What is frequently also problematic is if a deviation is far away from a correct segmentation region, which remains unconsidered in the case of the pixel-wise accuracy or intersection-over-union. By way of example, if a plurality of detailed images of sections of the ascertained sample region are recorded on the basis of the sample region of a segmentation mask and if these are assembled to form an overall image (image stitching), this may supply a correct result in the case of the segmentation mask 22 while a part of the sample is missing in the detailed examination under certain circumstances in the case of the segmentation mask 21. Similar quality criteria such as ORR (overall recognition rate) or ARR (average recognition rate) are also not meaningful enough in many applications since they do not map the spatial and application-specific relevance of errors arising.

If a fully trained image processing model does not supply image processing results with a sufficiently good quality, this should be able to be determined with as little manual outlay as possible. This is not yet achieved with the procedure explained in relation to FIG. 1. The measures described above serve to provide a better understanding of the underlying problem and are based on preliminary work for the invention, which does not necessarily belong to the known prior art.

Microscopy systems in which a segmentation of recorded images is implemented by trained models were described by the applicant in, inter alia, DE 10 2017 111 718 A1, DE 10 2017 109 698 A1, DE 10 2018 133 188 A1, DE 10 2019 113 540 and DE 10 2019 114 012. The above-described problem of evaluating a trained image processing model also arises more generally in cases that relate to a different image output rather than a segmentation.

SUMMARY OF THE DISCLOSURE

An object of the invention can be considered that of specifying a microscopy system and a method which facilitate quality verification of a trained image processing model as precisely as possible, while requiring little manual outlay.

This object is achieved by means of the microscopy system having the features of Claim 1 and by means of the method having the features of Claim 2.

According to the invention, the computing device in the microscopy system of the aforementioned type is set up to carry out the following processes for the purposes of verifying the trained image processing model:
  receiving a validation image and an associated target image;
  entering the validation image into the trained image processing model, which calculates an output image therefrom;
  entering image data based on at least the output image and the associated target image into a trained verification model which is trained to calculate an evaluation that depends on the entered image data; and
  calculating an evaluation by the trained verification model on the basis of at least the entered image data.

Accordingly, a method according to the invention for verifying a trained image processing model comprises at least the following processes: receiving a validation image and an associated target image; entering the validation image into the trained image processing model, which calculates an output image therefrom; entering image data based on the output image and the associated target image into a trained verification model which is trained to calculate an evaluation that depends on entered image data; and calculating an evaluation by the trained verification model on the basis of the entered image data.

A verification model based on machine learning can implement an evaluation of the quality of calculated output images and an evaluation of the quality of the image processing model on the basis thereof in substantially more robust fashion. Conventionally programmed evaluation criteria there are simpler, such as the intersection-over-union mentioned at the outset, provide a sufficiently precise statement about the quality only in some cases. A great variety of possible image content that should be processed by the image processing model can moreover be taken into account in improved fashion by appropriate training data of the verification model when compared to the case of conventional evaluation algorithms. The entered image data considering not only the output images of the image processing model but also information from associated target images is relevant for reliable assessments by the verification model. In this case, the target images relate to a desired result which the image processing model and not the verification model should learn.

The learned verification model offers advantages, in particular, if an image processing model should be trained repeatedly or automatically. By way of example, it might be the case that training data of an image processing model are frequently extended, with new learning processes being required each time. Before the trained image processing model is used for unseen microscope images, the verification model can ensure that the quality of the image processing model is satisfactory.

It might also be the case that a microscope user without more comprehensive knowledge about machine learning wishes to train a provided image processing model with their own training data. By way of their own training data, the image processing model can be adapted to typical image types from experiments by the microscope user. More complex manual analyses by the microscope user for evaluating the image processing model trained with their own training data can be dispensed with by virtue of the verification model being used according to the invention.

Optional Designs

Advantageous variants of the microscopy system according to the invention and of the method according to the invention are subjects of the dependent claims and will be explained in the description that follows.

Image Processing Model, Validation Image, Output Image and Target Image

The image processing model can be a model which is designed in any way in principle, which is learned by machine learning and which receives at least one input image as input. In principle, an architecture of the model can have any design and, for example, comprise a deep neural network, in particular one or more convolutional neural networks (CNN).

A specific example of an image processing model is a segmentation model which calculates an output image, which is a segmentation mask, from an input image. In a segmentation mask, different pixel values can denote different objects or object types. Various segmentation regions are distinguished by the pixel values. The segmentation mask can be a binary mask or else permit more different pixel values in order to distinguish between a plurality of object (types). The segmentation model can be designed for semantic segmentation, in which a meaning (semantic) is assigned to two or more image regions. Additionally, the segmentation model could be an entity segmentation model in which different objects of the same type are distinguished from one another. By way of example, if sample images with cell organelles are segmented and two similar cell organelles overlap or are in contact with one another, the entity segmentation does not for instance output a common image region for both cell organelles but differentiates between two image regions which are distinguished from one another, for example by different pixel values. A segmentation model can also be designed to output a plurality of binary masks for an input image, a different object type being ascertained in each binary mask.

More generally, the image processing model can be designed to calculate an image-to-image mapping. In addition to segmentation, this can include denoising, with an output image having less image noise than an input image. The image-to-image mapping may also be a deconvolution, a super-resolution or a mapping from one microscopy contrast method to another microscopy contrast method (contrast-to-contrast). In the latter case, a way of representation from a phase contrast or DIC method, for example, is adopted such that a user is provided with a representation which they are familiar with or which is more easily comparable to other images.

The image processing model can also be a detection model which indicates detection results with respective image coordinates as an output image. Within this meaning, an output image can also be formed by geometric specifications, for example, a list with coordinate specifications which denote locations of detected objects in the input image. In particular, coordinates can relate to bounding boxes, i.e., rectangles or other shapes that frame a respective detected object.

Values of model parameters of the image processing model are learned during training. This could be unsupervised training, in which training data only comprise input images, or supervised training, in which an associated target image is specified as an annotation for each training/input image. The target image corresponds to a desired output of the image processing model and is also referred to as "ground truth". Model parameter values are iteratively defined such that calculated outputs correspond to the best possible extent with the specified target images.

A validation image is understood to mean an image which serves as input image for the image processing model and for which a target image is available. By way of example, the validation image can be an overview image of a microscope. In contrast to training images, a validation image is typically not used during the training for the iterative adaptation of the image processing model but is subsequently used to evaluate the generalizability or quality of the image processing model. In conventional procedures, an output image calculated from a validation image is generally assessed according to the same evaluation standard as the output images calculated from the training images, for example according to the pixel-wise accuracy/intersection-over-union of segmentation results, as mentioned at the outset. A validation image is used differently in the present case and can, in principle, also be one of the training images for iteratively defining the model parameter values, as will be described in more detail below.

The target image which is specified for a validation image corresponds in the type of image to the output images of the trained image processing model. Hence, in the case of a segmentation model, both output image and target image respectively are a segmentation mask, in which sample regions are distinguished from non-sample regions, for example. In particular, the target image may have been generated by manual annotation.

If the image processing model carries out image-to-image mapping for super-resolution, the image processing model may have been trained using training images which comprise low resolution images as inputs and higher resolution images of the same sample as target images. The higher resolution images may have been recorded using a different microscope or different microscope settings, in particular a different objective, a stronger illumination or other detection properties.

In the case of a detection model, the target image available for a validation image specifies image coordinates of structures or objects to be detected. In particular, validation images are used with target images in which coordinates of two or more objects to be detected are specified together with the respective object type. Consequently, an arrangement of the objects is known. The arrangement plays a role for the verification model described in more detail below since there are certain size or position relationships/arrangements between some objects to be detected. By way of example, certain size and position relationships may typically occur between the nucleus, various organelles and a membrane in the cell, while other relationships may indicate a detection error.

Verification Model

The verification model has been learnt by a learning algorithm on the basis of specified training data. In particular, the verification model may comprise a deep neural network, for example one or more CNNs or FCNs.

The fully trained verification model should evaluate outputs of the image processing model in qualitative fashion. To this end, the image processing model initially calculates an output image from a validation image which is entered into the image processing model. A target image has been specified for this validation image. A pair of target image and output image, which belong to the same validation image, form the image data which the verification model receives as input data.

The image data may comprise the output image and the associated target image separately, i.e., two images are entered into the verification model together, with the latter calculating a quality evaluation of the output image therefrom. The quality evaluation represents a measure of correspondence between output image and target image.

Alternatively, a common representation can initially be calculated from the output image and the associated target image. The representation can be an image which represents information from or differences between the output image and the associated target image. The image data entered into the trained verification model are given by the representation in this case, without the output image and the associated target image being entered into the verification model. Consequently, an evaluation of the quality of the output image can be calculated on the basis of a single image entered into the verification model.

The representation of the output image and the associated target image can be an image which indicates pixel-wise differences between the output image and the associated target image. To this end, it is possible to calculate the difference between the output image and the target image. Particularly in the case of segmentation masks as output and target images it is also possible to calculate the representation by pixel-wise addition or multiplication of the output image with the associated target image. In the case of a multiplication of binary masks as output and target images, the two possible pixel values of the binary masks are chosen unequal to zero in each case because in the case of a multiplication of a pixel value of zero by a pixel value of the other image, the result would always be zero independently of the pixel value of the other image, and so the image difference between output image and target image would not be rendered visible.

An output image that is a segmentation mask is also referred to as output segmentation mask in the present case.

Analogously, a target image which is a segmentation mask is referred to as target segmentation mask. As described, these segmentation masks are each divided into at least two different segmentation regions. The common representation of output image and associated target image might now also be a distance-transformed image. In this case, a value of a pixel specifies a distance of the respective pixel of the output segmentation mask from the closest pixel of the same segmentation region in the target segmentation mask. By way of example, a sample region might be segmented in each of the output segmentation mask and target segmentation mask, with the sample regions of the two segmentation masks overlapping only in part. In a distance-transferred image, a pixel value of a pixel corresponds to the distance which the corresponding pixel of the output segmentation mask (e.g., a pixel of a sample region) has from a closest pixel of the same segmentation type (i.e., a pixel of a sample region) in the target segmentation mask. That is to say, a distance-transformed image contains ever greater pixel values, the greater the image distances are between corresponding structures in the output image and target image.

Training Data of the Verification Model

Model parameter values of the verification model are defined on the basis of training data. In their type, these correspond to the aforementioned image data. If the image data are formed by the described common representation, which is calculated from an output image of the image processing model and associated target image, the corresponding representations are used as training images for the verification model. The training images may each comprise an annotation which indicates an associated evaluation. As a result, the verification model learns to generate an evaluation for entered image data.

By contrast, should the verification model be able to process the image data which separately comprise an output image of the image processing model and an associated target image, the verification model may have been trained using training image data which correspond to or are based on an output type of the image processing model. Thus, the segmentation masks of the image processing model that output training image data may comprise associated target segmentation masks and respective evaluations of the output segmentation masks as annotations.

The aforementioned annotations can be used in a supervised learning process. Annotations can be dispensed with if the verification model is learned within the scope of unsupervised training. By way of example, all utilized training data may correspond to a positive evaluation and the verification model is trained as an anomaly detector using these training data.

Evaluation of a Quality of the Image Processing Model

The trained verification model calculates an evaluation of an output image calculated by the image processing model for a validation image. By way of example, the evaluation of the output image can indicate a classification into one of a plurality of evaluation classes or a score from a continuous value range. Depending on the evaluation of the output image it is possible to deduce a quality of the image processing model. Optionally, a plurality of validation images are considered to this end.

Accordingly, it is possible to obtain a plurality of validation images, each with an associated target image. The processes already described for a validation image are carried out for each of the validation images with the respectively associated target image such that the verification model outputs a plurality of evaluations. The plurality of evaluations are now used to assess whether the trained image processing model supplies a sufficient quality. By way of example, a sufficient quality may be given if a specified minimum number or minimum rate of positive evaluations in relation to output images is achieved.

Renewed Training of the Image Processing Model

If an insufficient quality of the image processing model is deduced on the basis of the evaluation(s), it is possible to carry out a new training iteration of the image processing model. Hyperparameters of the image processing model can be altered for the new training iteration. By way of example, the hyperparameters can relate to the model architecture, e.g., size or number of layers of a CNN, or the learning process, e.g., by way of the learning rate or type of regularization.

The validation images used within the meaning of the present application can optionally be training images of the image processing model. In this case, the validation images for which an output image was evaluated as inadequate/faulty by the verification model can be weighted more strongly during the new training iteration. As a result, the image processing model learns to process an image in the style of the incorrectly processed validation image in more similar fashion to the specified target image during the new training.

However, as an alternative or in addition thereto, some or all of the validation images are images that were not used during the training of the image processing model for the iterative adaptation of the model parameter values.

General Properties

A microscopy system is understood to be an apparatus comprising at least a computing device and at least one microscope. A microscope can be understood to mean a measuring device with in principle any magnification, in particular a light microscope, an x-ray microscope, an electron microscope, an ophthalmoscope, a macroscope or a differently designed magnifying image recording device.

The computing device can be designed to be physically part of the microscope, can be arranged separately in the microscope surroundings or can be arranged at a location at any distance from the microscope. The computing device can also have a decentralized design and can communicate with the microscope by way of a data link. In general, it can be formed by any combination of electronics and software and, in particular, comprise a computer, a server, a cloud-based computing system or one or more microprocessors or graphics processors. The computing device can also be set up to control the microscope camera, the image recording, the sample stage control and/or other microscope components.

An overview camera for recording an overview image may be present in addition to a sample camera which is used to record a more magnified image of a sample region. However, this may alternatively also be the same camera, with different objectives or optical systems being used for recording an overview image and a more magnified sample image. A microscope image can be supplied directly, as recorded by a camera, to the image processing model or can be initially calculated from one or more raw images before it is supplied to the image processing model.

A computer program according to the invention comprises commands which, upon execution by a computer, prompt one of the described method variants to be carried out. In particular, the computer program may comprise commands which can be implemented by the procedures described in relation to the computing device.

To clarify, the designations of various images are repeated again: An input image of an image processing model can be a microscope image or a validation image. From this, the image processing model calculates an output image. Provided nothing else is specified, an output image in the present case relates to an image which the image processing model calculates from a validation image. A validation image can be the same as a microscope image and it is distinguished in that an associated target image is available. The target image represents an ideal output image which the image processing model should ideally calculate from the corresponding validation image. An output image of the image processing model is also referred to as image processing result. An output image and an associated target image (i.e., the output image was calculated from a validation image and the target image is specified for this validation image) together form image data that are entered into the verification model. These image data can comprise the output image and target image as separate images or comprise these in a manner combined by calculation as a single image which is referred to in the present case as a (common) representation. The image data may also comprise a plurality of pairs of output image and associated target image, or a plurality of representations, each of which are calculated from an output image and an associated target image.

To ease linguistic understanding, the singular form is often used; this should comprise the variants of "at least one" and "exactly one". The input of image data on the basis of an output image and target image, in respect of which the verification model calculates an evaluation, may mean, in particular, that at least one such input is implemented, i.e., also two or more inputs of image data on the basis of an output image and a target image in each case, for which a combined evaluation is output or for which an evaluation is output separately in each case. In the case of a total of only one evaluation, the latter can simultaneously represent the assessment of the image processing model. The calculation of the aforementioned evaluation/assessment can be understood to be the verification of the trained image processing model.

In principle, the method according to the invention can be used for any image processing model which outputs images or other processing results which are representable in the form of an image and which are referred to as output images in the present case. In particular, the method can be carried out autonomously from image recording devices such as microscopes, for example, if it resorts to stored image information.

Various exemplary embodiments of the invention substantiate properties of a training procedure or training data. In this respect, variants of the invention should comprise firstly the implementation of a corresponding training procedure and secondly the use of a model fully trained in this manner (without the training procedure still having to be carried out), independently of whether the described exemplary embodiment describes properties of a fully trained model or properties of the learning procedure.

While training methods of supervised and unsupervised learning are described for easier understanding, these variants can also be modified into partly supervised training, in which only some of the training data are annotated. Alternatively, reinforcement learning is also possible.

The properties of the invention described as additional apparatus features also yield variants of the method according to the invention when used as intended. Conversely, the microscopy system can also be set up to carry out the described method variants. In particular, the computing device can be set up to carry out the described method variants and output control commands for implementing described method steps. Moreover, the computing device can comprise the described computer program.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Figure 2:
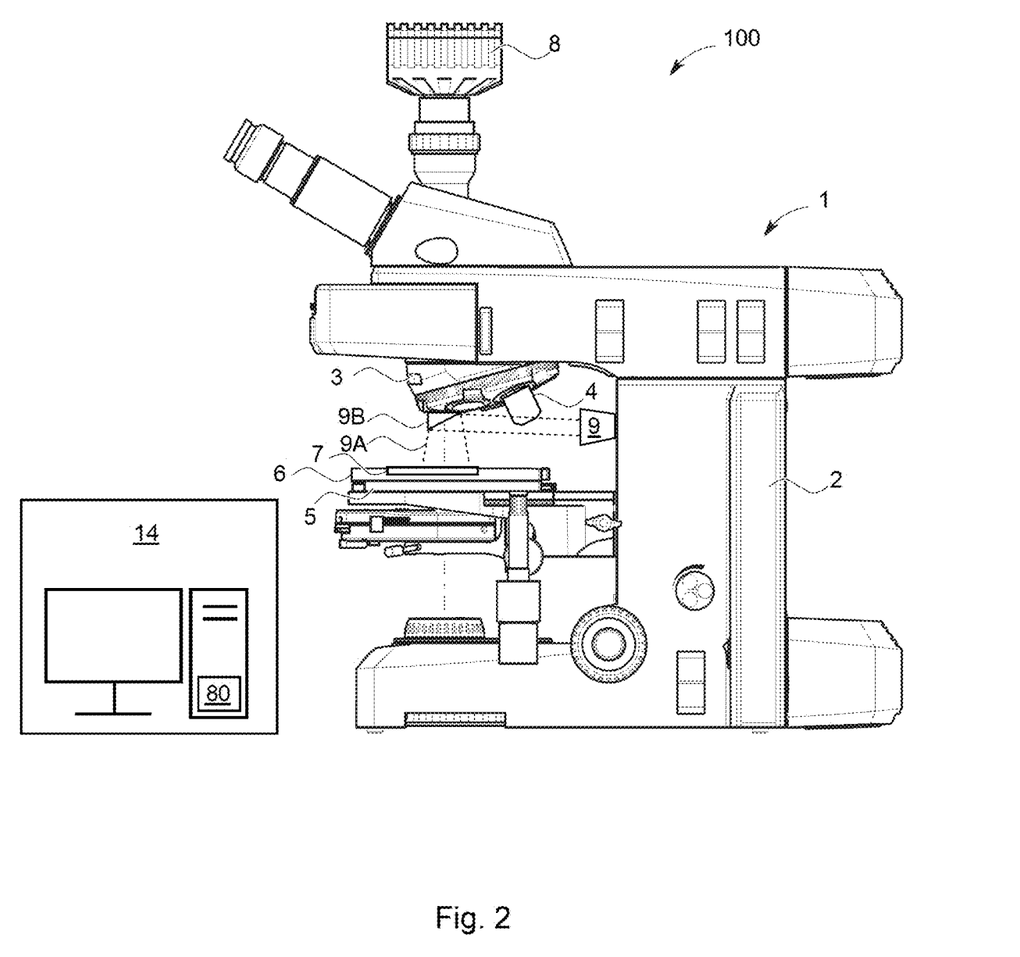
FIG. 2 is a schematic illustration of an exemplary embodiment of a microscopy system of the invention.

Various exemplary embodiments are described below with reference to the figures.
FIG. 2

FIG. 2 shows an exemplary embodiment of a microscopy system 100 according to the invention. It comprises a computing device 14 and a microscope 1, which is a light microscope in the example illustrated but can in principle also be any other type of microscope. The microscope 1 comprises a stand 2, by means of which further microscope components are held. These may include in particular: an objective interchanger or turret 3, to which an objective 4 has been attached in the illustrated example, a sample stage 5 with a holding frame 6 for holding a sample carrier 7, and a microscope camera 8. If the objective 4 has been swiveled into the microscope beam path, the microscope camera 8 receives detection light from one or more samples held by the sample carrier 7 in order to record a sample image. Samples can be any types of objects, fluids or structures. Moreover, the microscope 1 comprises an overview camera 9 for recording an overview image of sample surroundings. As a result, the overview image can show, in particular, the sample carrier 7 or a part thereof. A field of view 9A of the overview camera 9 is greater than a field of view when recording a sample image. In the illustrated example, the overview camera 9 views the sample carrier 7 via a mirror 9B. The mirror 9B is arranged on the objective turret 3 and can be chosen instead of the objective 4. In modifications of this embodiment, the mirror or another deflection element may also be arranged at a different location. Alternatively, the overview camera 9 can also be arranged such that it views the sample carrier 7 directly without mirror 9B. While the overview camera 9 views the sample carrier 7 from above in the illustrated example, the overview camera 9 may alternatively also be arranged in such a way that it sees a lower side of the sample carrier 7. In principle, the microscope camera 8 can also represent an overview camera if a different objective, in particular a macro-objective, is selected by way of the objective turret 3 for the purposes of recording an overview image.

In the present case, a microscope image can be understood to mean an overview image or sample image, as described above. The microscope image can correspond to recorded raw data or only be formed by further processing of the raw data. The computing device 14 comprises a computer program 80 with a trained image processing model for processing at least one microscope image.

The image processing model should process entered images into evaluable outputs as reliably as possible. Incorrect results can render an experiment unusable, generate image artefacts that irritate or deceive a user or else lead to incorrect microscope controls or movements, which may result in a collision and component damage.

Therefore, an image processing model should be verified before the image processing model is used in normal operation. If there is relatively frequent retraining of the image processing model, for example with complemented training data, a manual outlay of the verification should be kept low. By way of example, a microscope user wishing to train the image processing model with their own microscope images as training data, fitting to their own experiments, may optionally be provided for. Before this image processing model is actually used, a verification should ensure a correct functionality of the image processing model. This is implemented using a learned verification model, which is described in more detail with reference to the following figure.

Figure 3:
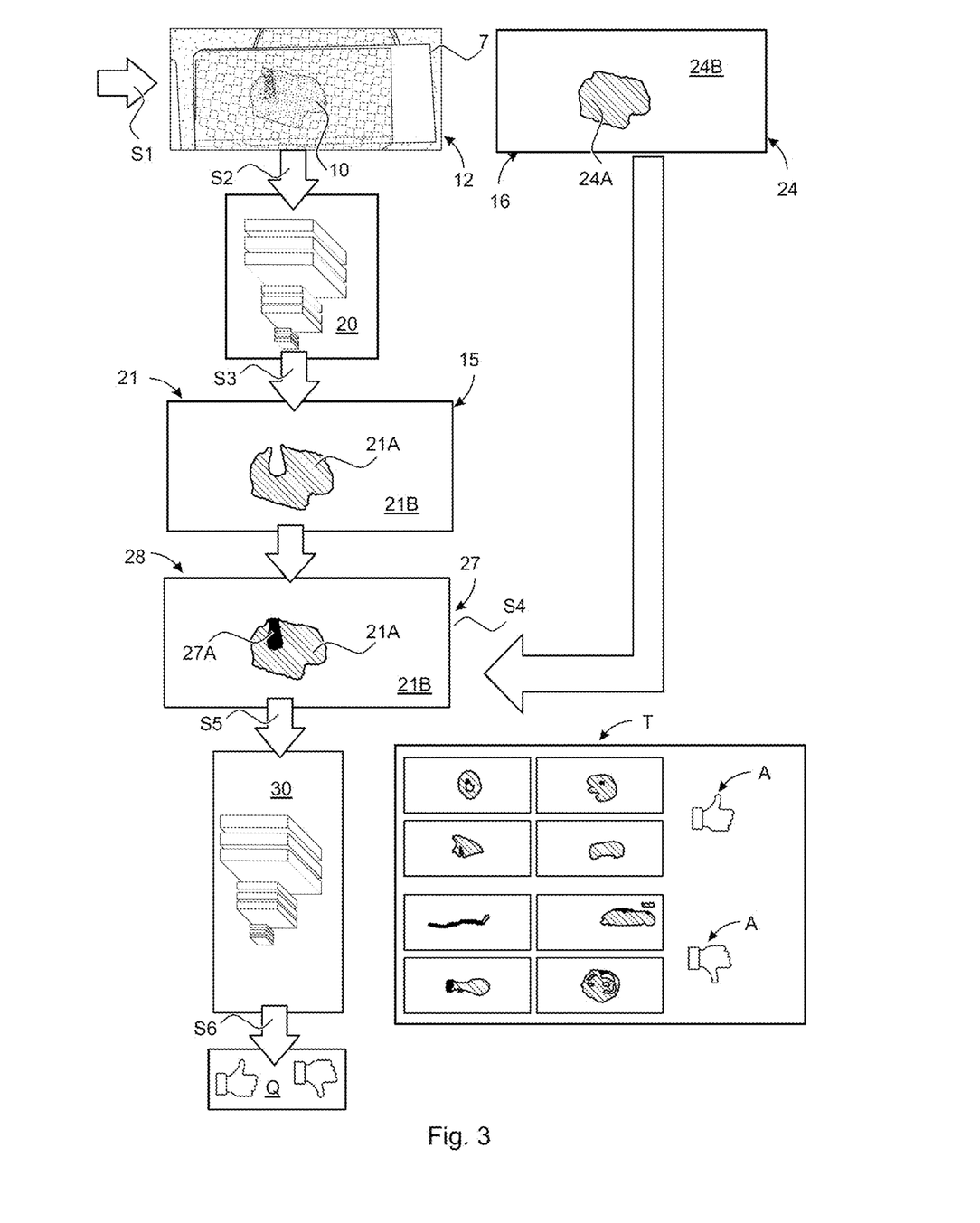
FIG. 3 schematically shows a procedure of an exemplary embodiment of a method of the invention.

FIG. 3

FIG. 3 schematically shows procedures of an exemplary embodiment of a method of the invention for evaluating a trained image processing model. The procedures can be implemented with the aid of the computing device or the computer program of FIG. 1.

Initially, a validation image 12, which may be a microscope image or which may have been calculated from one or more microscope images, is obtained in step S1. The validation image 12 may be loaded from a memory or recorded directly by the microscope of FIG. 1. In the illustrated example, the validation image 12 is a microscope image which shows a sample carrier 7 with a sample 10.

In step S2, the validation image 12 is entered into a trained image processing model 20 which calculates an output image 15 in step S3. By way of example, the image processing model 20 is a segmentation model which calculates a segmentation mask 21 as image processing result or output image 15. In the segmentation mask 21, one pixel value characterizes a sample region 21A while another pixel value represents a background 21B.

A target image 16 is specified for the validation image 12, said target image representing an ideal result which the output image 15 of the image processing model 20 should come as close to as possible. In the illustrated example, the target image 16 is a target segmentation mask 24 with a sample region 24A and a background 24B.

In the case of a high quality of the image processing model 20, the sample region 21A of the segmentation mask 21 should correspond as exactly as possible to the sample region 24A of the target image 16 or as exactly as possible to the image region of the sample 10 in the validation image 12. This cannot be determined in satisfactory fashion by way of a simple evaluation standard. As also explained at the outset like in the case of FIG. 1, an area correspondence between the sample region 21A of the segmentation mask 21 and the sample region 24A of the target image 16 can be very high, for example in the case of a faulty segmentation mask 21. By way of example, more than 95% of all pixels may be classified correctly even in the case of an inadequate segmentation result.

To verify the segmentation mask 21 or, more generally, the output image 15, a common representation 27 is initially calculated in step S4 from the output image 15 and the target image 16. The representation 27 is an example of general image data 28 which are based on the output image 15 and the associated target image 16. To form the representation 27 it is possible to superpose the output image 15 and the target image 16, for example by being added or subtracted from one another in pixel-wise fashion. The common representation 27 shows a segmentation error or, in general, an image difference 27A, which identifies a difference between the output image 15 and the target image 16. Whether the image difference 27A is relevant or negligible may depend on numerous factors, for example on its shape, its size, its size relative to the segmented sample region 21A, its shape relative to the shape and/or size of the segmented sample region 21A, its absolute position in the image and/or its relative position in the image with respect to the segmented sample region 21A. Other features may be particularly relevant in turn in the case of different objects as sample regions.

While handling these features and, in particular, the multiplicity of possible features is hardly possible by way of evaluation criteria that are able to be created in practical fashion, there can be a reliable evaluation by way of a trained verification model 30.

The verification model 30 receives the representation 27 as input image in step S5. The verification model 30 is formed with a deep neural network which is trained on the basis of training data T to calculate an evaluation Q for an input image. The evaluation Q of an output image 15 is output in step S6. The training data T comprise a plurality of images or representations, for each of which an annotation A indicating a good or poor evaluation is specified. As a result, the verification model 30 is trained to generate for an unknown input image an evaluation Q, which corresponds to the annotations A, on the basis of the image content of the input image.

Figure 4:
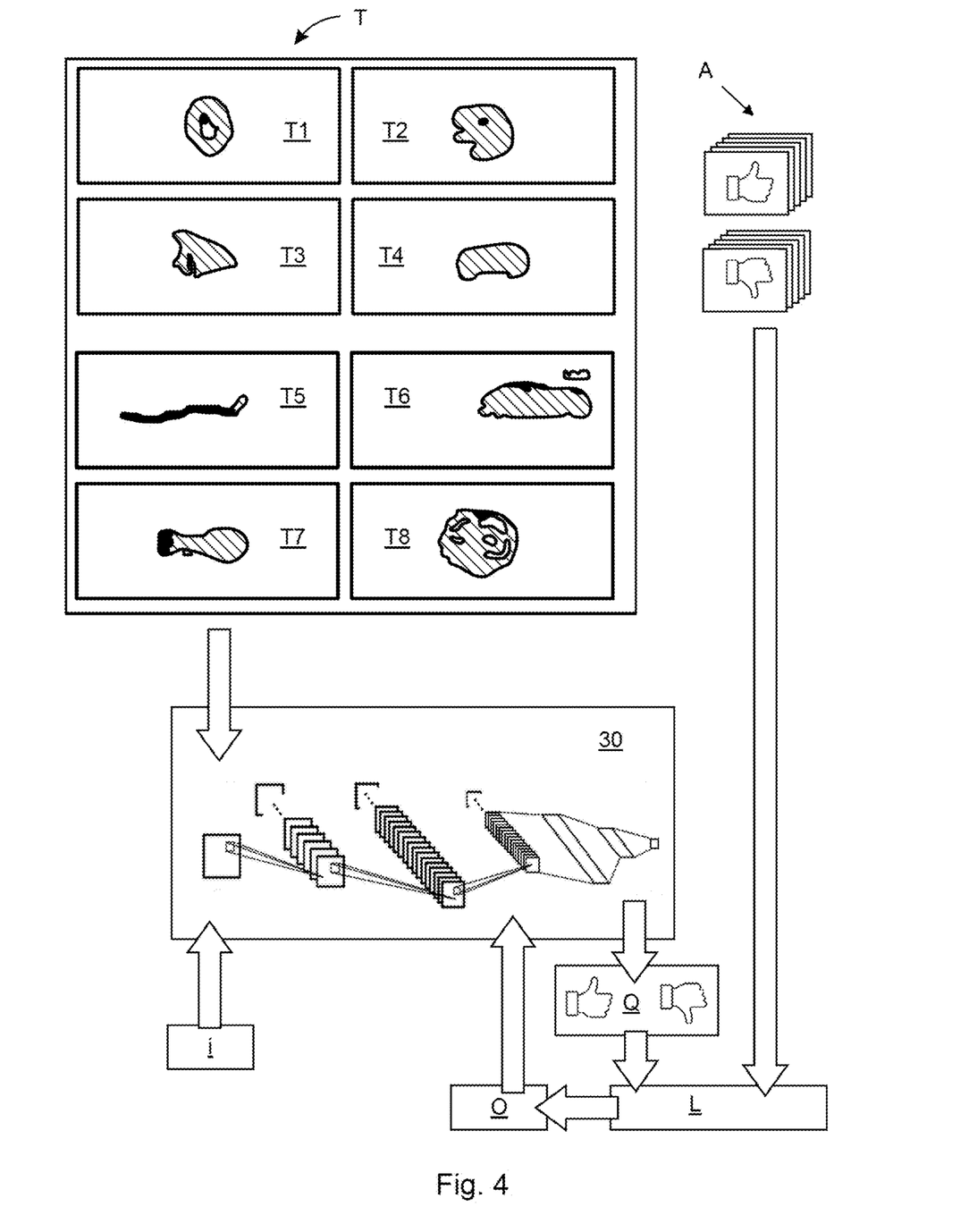
FIG. 4 schematically shows a training of the verification model of exemplary embodiments of the invention.

A training procedure of the verification model 30 is described below with reference to the following figure.

FIG. 4

FIG. 4 schematically shows a training procedure of the verification model 30. This training procedure is part of some method variants of the invention. Further variants of the invention use the verification model 30 fully trained in this manner without the training steps per se being part of the claimed method steps.

Training data T are provided and comprise a plurality of training images T1-T8 with a respective annotation A. The annotations A indicate an associated evaluation for each training image T1-T8. In the illustrated example, these might be good or poor evaluations, with, in principle, a greater number of evaluation classes or, in principle, an arbitrary fine value specification within a value range also being possible.

In the example shown, the training images T1-T8 are formed like the representations 27, i.e., by superposition or combination by calculation of output images of the image processing model ultimately to be evaluated with specified target images of the image processing model. More generally, the representations 27 may however also have been generated by way of output images of other image processing models. In the example shown, they may have been formed by superposition of any segmentation masks and associated target/segmentation masks assumed to be true.

The training images T1-T4 show representations for which the annotations A specify a positive evaluation in each case. By contrast, a negative assessment by the annotations A is specified for training images T5-T8.

An advantage over conventional quality measures for evaluating segmentation results is mentioned in relation to the training image T5. The target image belonging to T5 shows a thin, elongated structure, only the right end of which was correctly ascertained by the associated output image, with the remaining elongate region (the region filled in black in T5) missing completely. A conventional quality measures such as ORR or ARR supplies a high quality in this case because the missing thin elongate structure only comprises a few pixels and consequently only a few pixels were segmented/classified incorrectly. By contrast, following a training with the training images T1-T8, such cases can be identified with a greater reliability and can be evaluated accordingly.

The training images T1-T8 are entered into the verification model 30 to be trained, which calculates outputs Q on the basis of start model parameter values. In this example, a positive or negative evaluation is calculated as an output Q for each training image. A specified loss function L captures differences between the outputs Q calculated with the current model parameter values and the annotations A. An optimization function O iteratively minimizes the loss function L, for the purposes of which the optimization function iteratively adapts values of the model parameter values, for example by gradient descent and back propagation.

Optionally, context information i may also be entered together with the training images T1-T8 within the scope of the training. As a result, a model is learned, which also considers context information to be entered in the calculation of an evaluation Q. By way of example, the context information i may relate to a type of sample, which may supply information about probable and improbable shapes, sizes and number of sample regions in an image. Moreover, the context information may relate to a type of experiment carried out, device settings or a sample carrier type.

Annotations A may also indicate evaluations in a more complex manner. By way of example, a plurality of evaluations may also be specified in each case as annotations for some or all of the training images. The plurality of evaluations of the same training image may have been specified manually by different users, for example. As a result of such a broader assessment it may be possible to increase the robustness under certain circumstances.

Analogously, a target image can also be based on an assessment of a plurality of users. By way of example, a plurality of users can each specify a target image for the same training/validation image and an average of these plurality of target images is used in the training described above.

FIG. 4 illustrates a supervised learning procedure. In other modifications it is possible to use an unsupervised learning procedure without specified annotations A. By way of example, the verification model 30 can be trained for anomaly detection by way of unsupervised learning. Thus, all utilized training images may correspond to a positive evaluation. If the fully trained verification model obtains an input image that deviates from the distribution of utilized training images, an anomaly is determined and interpreted as a negative evaluation.

Figure 5:
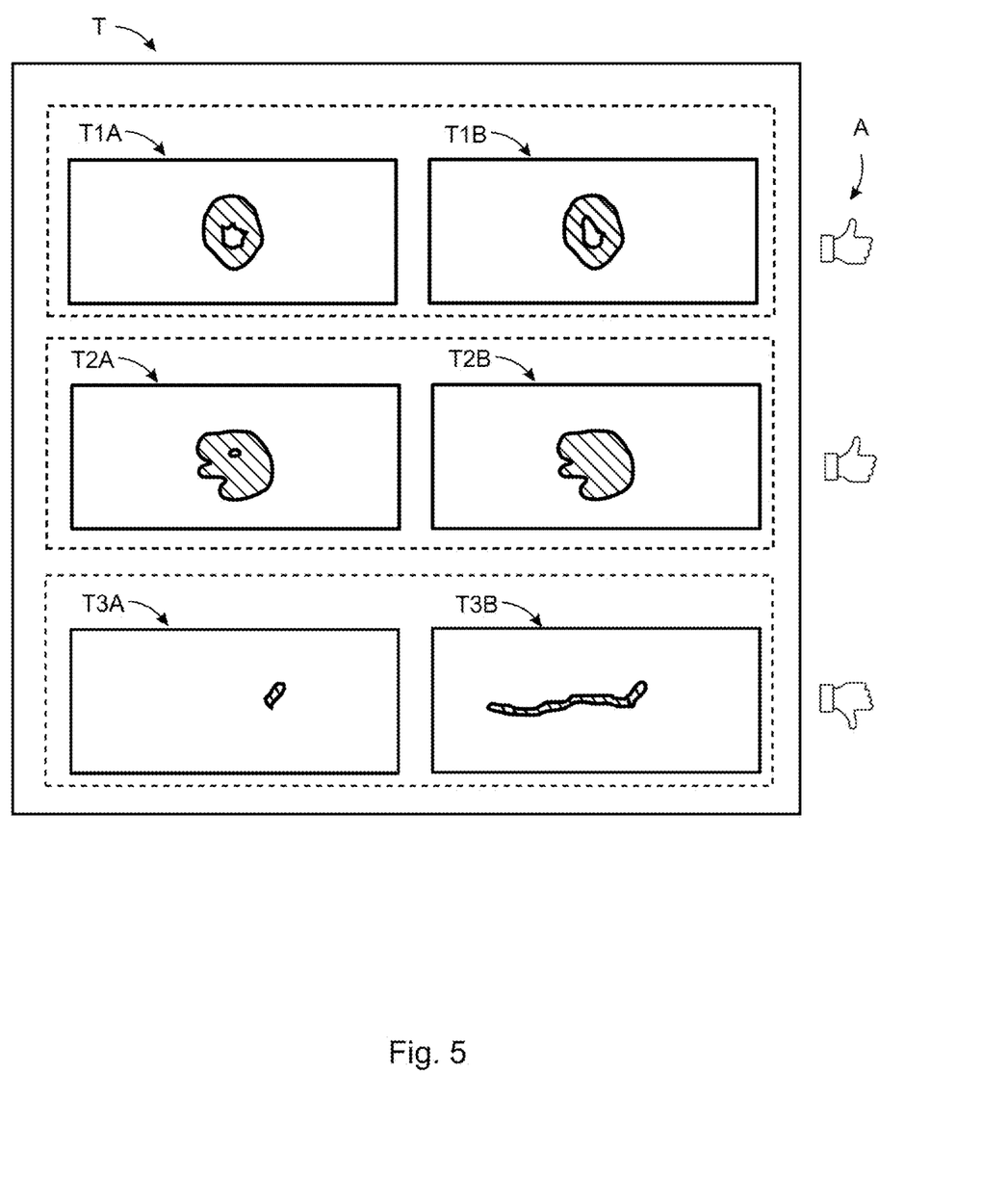
FIG. 5 shows training data for a verification model of exemplary embodiments of the invention.
Figure 6:
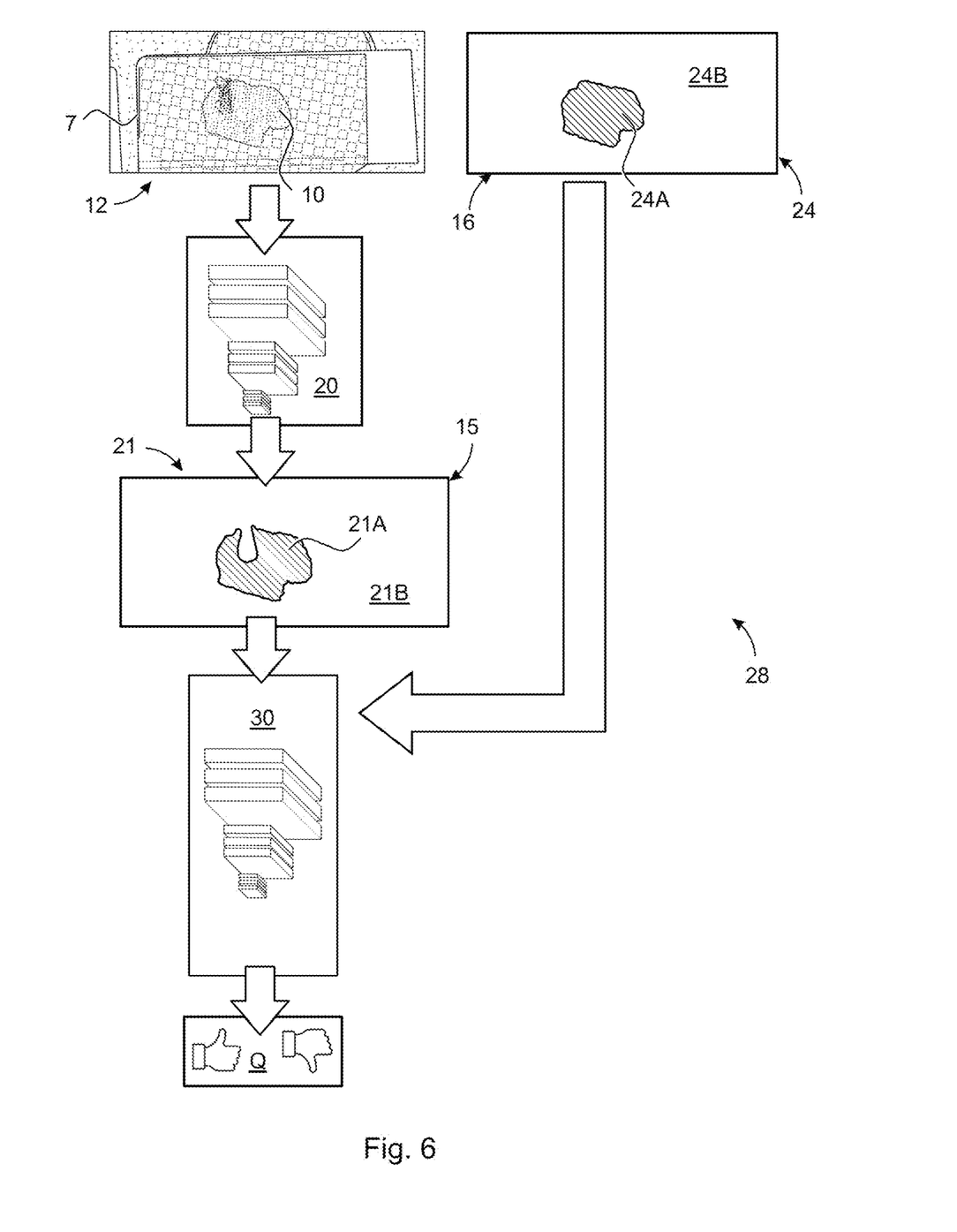
FIG. 6 schematically shows a procedure of an exemplary embodiment of a method of the invention.

FIGS. 5 and 6

FIG. 5 schematically shows training data T that can be used in place of the training data shown in FIG. 4. In the case of FIG. 5, common representations are not calculated from an output image of an image processing model and an associated target image; rather, corresponding images are available in pairs. The training image T1A corresponds to a validation or input image for an image processing model while the training image T1B is an associated target image.

Likewise, the training data comprise further pairs of training images T2A, T2B and T3A, T3B. An annotation A indicating an evaluation is specified for each pair of training images, for example an evaluation of the similarity of the training image T1A to the associated training image T1B.

In this case, an input in the verification model is not formed by a training image on its own but by a pair of training images T1A, T1B or T2A, T2B or T3A, T3B. In this way, the verification model can learn to assess unseen images like in the preceding exemplary embodiment.

The use of the verification model 30 trained in this way is shown schematically in FIG. 6. This differs from the embodiment of FIG. 3 in that no common representation of an output image 15 and associated target image 16 is calculated. Rather, the output image 15 and the associated target image 16 are entered together into the verification model 30 as image data 28 and the verification model 30 calculates an evaluation Q therefrom.

The use of a common representation as per FIGS. 3 and 4 reduces the complexity of the problem. Under certain circumstances, fewer training data may be required and a better generalizability may be achieved. By contrast, the use of two separate images as per FIG. 5 may be used with different image processing models under certain circumstances without requiring further adaptations apart from the corresponding choice of training data.

Figure 7:
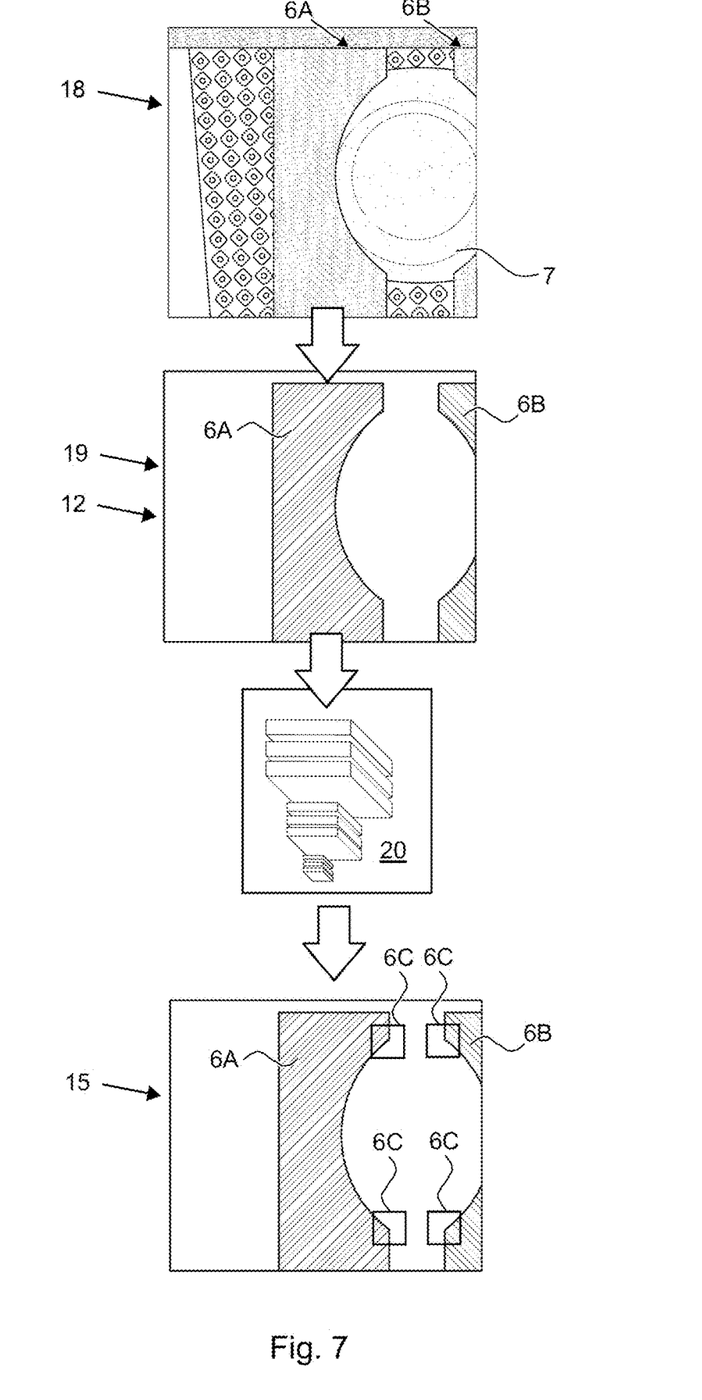
FIG. 7 schematically shows a procedure of partial steps of an exemplary embodiment of a method of the invention.

FIG. 7

FIG. 7 shows partial steps of a method variant according to the invention for the purposes of clarifying that the image processing model 20 need not be a segmentation model and the microscope images or validation images, which form inputs of the image processing model 20, may also be already processed images. A raw image 18 is initially recorded or calculated in the example of FIG. 7, said raw image in this example showing a sample carrier 7 which is held between two movable holding frame clamps 6A and 6B of a holding frame. A segmentation mask 19, in which the two holding frame clamps 6A and 6B are differentiated from the background, is initially calculated from the raw image 18. The segmentation mask 19 forms the input into an image processing model 20, as a result of which the segmentation mask represents a microscope image or validation image 12 in the terminology used in the present case.

In this example, the image processing model 20 is a detection model which indicates image coordinates of detected objects 6C as outputs, image coordinates of the inner corners of the holding frame clamps 6A and 6B in this example.

The image coordinates of the detected objects 6C represent an output image 15, which should be evaluated with the aid of a verification model in the manner already described above. To make this easier to understand, FIG. 7 shows a superposition of the detected objects 6C with the validation image 12, wherein however it is not mandatory to use a superposition. The number of detected objects 6C may vary depending on the positioning of the holding frame, with only certain arrangements of the detected objects 6C being able to realistically occur. Using the specified target images for output images 15 or for underlying validation images 12, the verification model is therefore able to learn to evaluate arrangements between detected objects 6C and thus distinguish a correct image processing result of the image processing model 20 from an incorrect result.

Figure 8:
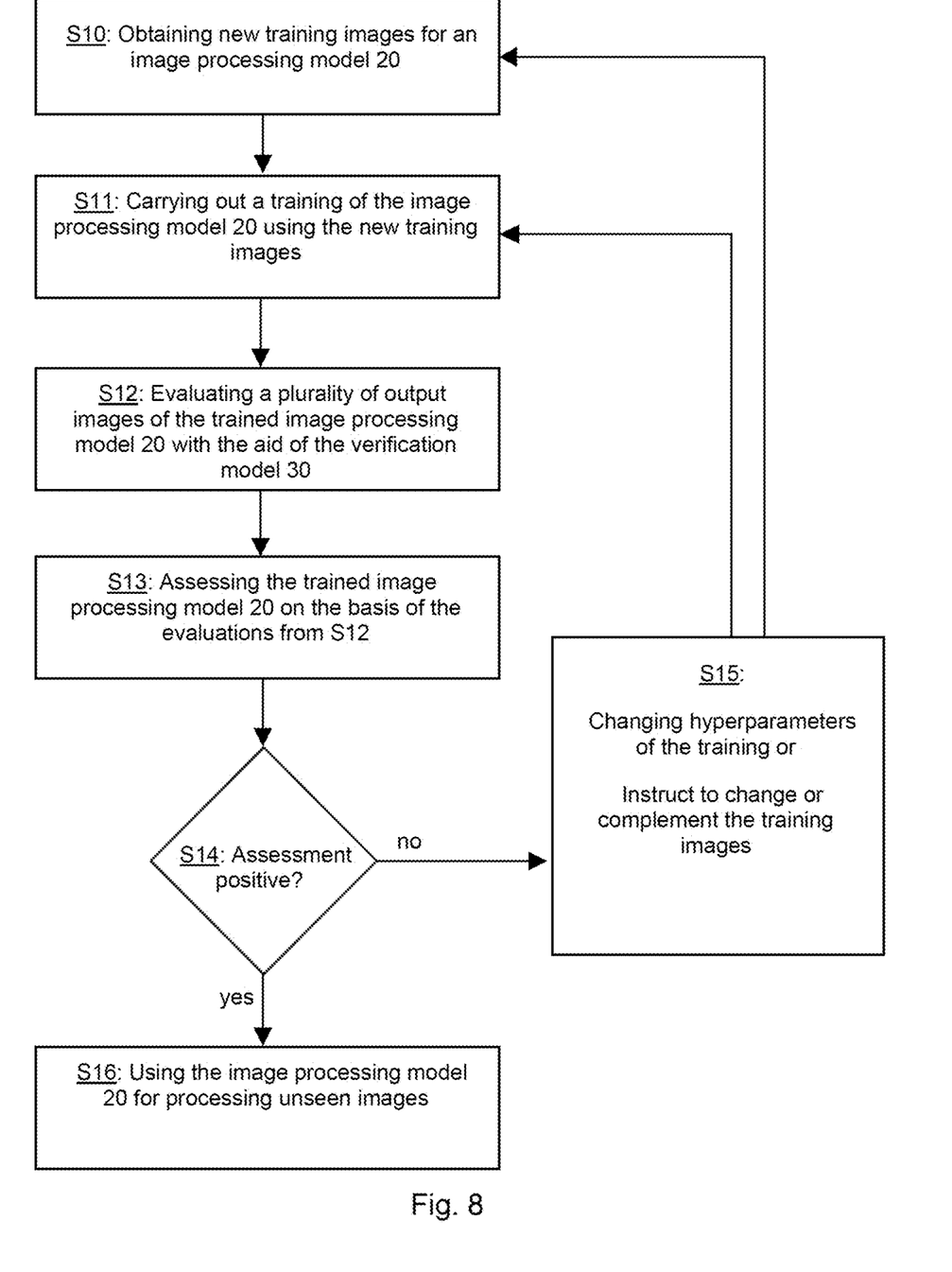
FIG. 8 schematically shows a procedure of an exemplary embodiment of a method of the invention.

FIG. 8

FIG. 8 shows a flowchart of a method variant according to the invention, which illustrates use purposes of the verification model 30.

The steps in FIG. 8 are suitable for new training of an image processing model 20 and can be implemented at the microscope manufacturer or by a microscope user. By way of example, new training of an existing image processing model 20 may become necessary if new training images are added, for example of further sample types, new sample carrier types or for a further imaging contrast method. While a human expert has previously evaluated the quality of a learned model, this object is taken over by the verification model 30 in the present case.

Initially, new training images for an image processing model 20 are obtained in step S10. The training images can complement or replace already available training images for the image processing model 20, or else be first-time training images for the image processing model 20.

The image processing model 20 is trained using the training images in step S11; i.e., model parameter values of the image processing model 20 are defined on the basis of the training images.

Subsequently, output images calculated by the trained image processing model 20 are evaluated in step S12, for example as described in relation to the preceding figures. In particular, a plurality of the new training images or previously already existing training images can be entered into the trained image processing model 20. The entered images can be the same that were also used for the iterative adaptation of model parameter values of the image processing model 20, or they can be a separate group of images which were not used in the iterative adaptation. The output images calculated from these images (validation images) by the image processing model 20 are supplied together with specified target images to the verification model 30, which calculates an evaluation for each of these output images.

An assessment of the trained image processing model 20 is ascertained from these evaluations of the output images in step S13. By way of example, at least a specified proportion of all evaluations of the output images must be positive/good so that the trained image processing model 20 is classified as qualitatively good. Alternatively, steps S12 and S13 can also be implemented together by the verification model 30. It is not mandatory for the verification model 30 to output a respective evaluation for the various considered output images; rather, it is sufficient for the verification model 30 to consider these output images and associated target images and overall purely output an assessment of the image processing model 20.

A check is carried out in step S14 as to whether the image processing model 20 was evaluated as positive or negative. Step S15 follows in the case of a negative assessment. Therein, it is possible to alter hyperparameters of the training, whereupon a new training is carried out in step S11. Alternatively, there can be a warning for the user or instructions to change or complement the training images, followed by step S10.

By contrast, in the case of a positive assessment in step S14 the image processing model 20 is released for further use. In step S16, the image processing model 20 can be used for processing images which were not seen during the training of the image processing model 20. During this intended use of the image processing model 20 the verification model 30 is no longer used.

The exemplary embodiments described are purely illustrative and modifications thereof are possible within the scope of the attached claims.

LIST OF REFERENCE SIGNS

1 Microscope
2 Stand
3 Objective turret
4 Microscope objective
5 Sample stage
6 Holding frame
6A, 6B Holding frame clamps
6C Detection results/inner corners of the holding frame clamps
7 Sample carrier
8 Microscope camera
9 Overview camera
9A Field of view of the overview camera
9B Mirror
10 Sample
11 Microscope image
12 Validation image
14 Computing device
15 Output image of the image processing model
16 Target image
20 Image processing model, in particular segmentation model
20' Image processing model, in particular segmentation model
21, 22 Segmentation mask
21A, 22A Sample region of the segmentation mask 21 and 22, respectively
21B, 22B Background of the segmentation mask 21 and 22, respectively
24 Target segmentation mask
24A Sample region in the target image
24B Background in the target image
25, 26 Comparison image
25A, 26A Segmentation error
27 (Common) representation
27A Image difference
28 Image data based on an output image 15 and associated target image 16
30 Verification model
80 Computer program
100 Microscopy system
A Annotations
i Context information
L Loss function
O Optimization function
Q Evaluation of an output image 15/output of the verification model
Q' Evaluation which was not implemented according to the invention
S1-S6 Steps/processes of method variants of the invention
S10-S16 Steps/processes of method variants of the invention
T Training data/training image data
T1-T8 Training images

What is claimed is:
1. A microscopy system, comprising:
a microscope which is configured to record at least one microscope image; and a computing device which comprises a trained image processing model configured to calculate an image processing result on the basis of the at least one microscope image;

wherein the computing device is configured to verify the trained image processing model by:

receiving a validation image and an associated target image;

entering the validation image into the trained image processing model, which calculates an output image therefrom;

entering image data based on at least the output image and the associated target image into a trained verification model which is trained to calculate an evaluation for entered image data wherein the evaluation indicates a quality that depends on the image data; and calculating an evaluation by the trained verification model on the basis of the entered image data.

2. A method for verifying a trained image processing model, wherein the method comprises at least the following processes:

receiving a validation image and an associated target image;

entering the validation image into the trained image processing model, which calculates an output image therefrom;

entering image data based on at least the output image and the associated target image into a trained verification model which is trained to calculate an evaluation for entered image data, wherein the evaluation indicates a quality that depends on the image data; and calculating an evaluation by the trained verification model on the basis of the entered image data.

3. The method according to claim 2, wherein the image data entered into the trained verification model comprise the output image and the associated target image as separate images.

4. The method according to claim 2, furthermore comprising:

calculating a representation from the output image and the associated target image;

wherein the image data entered into the verification model are the calculated representation.

5. The method according to claim 4, wherein the representation calculated from the output image and the associated target image is an image which indicates pixel-wise differences between the output image and the associated target image.

6. The method according to claim 4, wherein the output image is an output segmentation mask and the target image is a target segmentation mask, which are each divided into at least two different segmentation regions;

wherein the representation calculated from the output image and the associated target image is a distance-transformed image, in which a value of a pixel indicates a distance of the corresponding pixel of the output segmentation mask from the closest pixel of the same segmentation region in the target segmentation mask.

7. The method according to claim 2, furthermore comprising:

receiving a plurality of validation images with an associated target image in each case;

carrying out the processes specified in claim 2 for each of the validation images with the respectively associated target image such that the verification model outputs a plurality of evaluations;

assessing on the basis of the evaluations whether the trained image processing model supplies a sufficient quality.

8. The method according to claim 7, wherein a new training of the image processing model with altered hyperparameters of the image processing model is carried out depending on an outcome of the assessing whether the trained image processing model supplies a sufficient quality.

9. The method according to claim 2, wherein the validation image is an overview image of a microscope or derived from at least the overview image.

10. The method according to claim 2, wherein the output image and the target image each are a segmentation mask.

11. The method according to claim 2, wherein the image processing model calculates an image-to-image translation, in which denoising, a deconvolution, an increase in resolution or a translation from one microscopy contrast method to another microscopy contrast method is calculated, wherein the verification model has been trained with training image data which correspond to an output type of the image processing model.

12. The method according to claim 2, wherein the image processing model is or comprises a detection model which indicates detection results with respective image coordinates as the output image and wherein the associated target image indicates given detection results with respective image coordinates.

13. The method according to claim 2, wherein the trained verification model has been trained with training image data which correspond to the image data and each comprise an annotation which indicates an associated evaluation.

14. A computer program comprising commands stored on a non-transitory computer-readable medium which, upon execution by a computer, prompt the method according to claim 2 to be carried out.

15. The method according to claim 13, wherein the training image data of the trained verification model comprises input image data corresponding to the image data that is based on at least the output image and the associated target image;

wherein one of the associated evaluations indicated by the annotations depends on a characteristic of an image difference between one of the output images and the associated target image; and wherein the characteristic is at least one of: a shape of the image difference, a shape of the image difference relative to a shape or size of a segmented sample region, an absolute position of the image difference, or a relative position of the image difference with respect to a segmented sample region.

* * * * *